United States Patent [19]
Speis

[11] Patent Number: 5,575,521
[45] Date of Patent: Nov. 19, 1996

[54] TAIL GATE BOX, TABLE, AND SINK

[76] Inventor: Gregory D. Speis, 1516 Tijeras NE. #34, Albuquerque, N.M. 87106

[21] Appl. No.: 533,066

[22] Filed: Sep. 25, 1995

[51] Int. Cl.⁶ .................................................. B62D 25/00
[52] U.S. Cl. .......................... 296/57.1; 296/51; 296/37.6; 296/26; 108/44
[58] Field of Search ............................ 296/26, 50, 57.1, 296/51, 37.6; 108/44

[56] References Cited

U.S. PATENT DOCUMENTS

| | | | |
|---|---|---|---|
| 3,394,666 | 7/1968 | Pearlman | 108/44 X |
| 3,896,742 | 7/1975 | Ferraro | 108/44 |
| 4,023,850 | 5/1977 | Tillery | 296/26 |
| 4,089,276 | 5/1978 | Enos | 108/44 |
| 4,236,461 | 12/1980 | Barksdale | 108/44 |
| 4,444,429 | 4/1984 | Dawes | 296/51 X |
| 4,452,151 | 6/1984 | Jarrard | 108/44 |
| 4,455,948 | 6/1984 | Torres | 108/44 |
| 4,494,465 | 1/1985 | Fick, Jr. | 108/44 |
| 4,501,457 | 2/1985 | Pond | 312/314 |
| 4,829,910 | 5/1989 | Lirette | 108/80 |
| 4,830,242 | 5/1989 | Painter | 296/37.6 X |
| 4,887,526 | 12/1989 | Blatt | 108/44 |
| 4,995,322 | 2/1991 | Frederick | 108/44 |
| 5,136,953 | 8/1992 | Schmidt | 108/44 |
| 5,193,878 | 3/1993 | Weaver | 296/162 |
| 5,216,346 | 6/1993 | Reitzloff et al. | 296/51 |
| 5,328,225 | 7/1994 | Melching et al. | 296/26 |
| 5,427,033 | 6/1995 | Bly | 108/44 |

*Primary Examiner*—Joseph D. Pape
*Attorney, Agent, or Firm*—Clifford Kraft

[57] ABSTRACT

A fold-up combination tail gate table, sink, and storage box for the rear of a pickup truck containing a box or table made of steel, molded epoxy resin plastic or other suitable material mounted pivotally on an arm that can be attached to and removed from the truck's tail gate. The assembly is pivoted from a folded position on the closed tailgate to an open position from the open tailgate. It remains locked by forces on the leg(s) and the swivel arm contacting the table under the box as well as forces between the arm and the tailgate attach. In the unfolded position, the assembly is extremely stable and can support considerable weight. It becomes a table, a storage container, a sink for liquids, and with several optional circular holes, a holder for bottles, drinks or other containers. When the lid is closed, the lid itself becomes available for further use as a table. The assembly can be used for display, food preparation, fish cleaning, tool or food storage, or as a workbench as well as numerous other uses.

15 Claims, 5 Drawing Sheets

5,575,521

TAIL GATE BOX, TABLE, AND SINK

BACKGROUND

1. Field of the Invention

This invention relates generally to the field of portable utility platforms for vehicles and more particularly to an extendable truck tail gate box that can contain a sink for water and can act as a table and workbench as well as a storage compartment.

2. Description of the Related Art

Previous systems include simple fold away tables for "tail gate parties", and other types of platforms that extend from the trunk of a car, or the side or back of a truck, to allow eating, food preparation, and-other activities. There are also several types of tool storage boxes and work benches that attach to the front or rear of a car or truck that are used by the various trades. In addition, there are fold out tents, beds and camping affairs.

Pickup trucks are many times used as recreational vehicles for camping, pulling boats, etc. What is badly needed is a combination table, workbench, storage box, and sink (for washing dishes, etc.) that will fold out or extend from the rear of a pickup truck, when the tail gate is down, to allow various types of utility use for work, camping, fishing, hunting, and numerous other outdoor activities. This tail gate box could be used to store camping supplies, fishing supplies, tools, food, or anything else. It would have compartments that could be used as sinks with drain holes for washing dishes, cleaning fish, or any other use for a liquid basin. The combination sink/storage compartments would be removable when a simple table was required. This tailgate box would be easily adjustable to different heights without cumbersome locks.

SUMMARY OF THE INVENTION

The present invention relates to a fold-up combination tail gate table, sink, and storage box for the rear of a pickup truck. The entire assembly contains a box or table made of steel, molded epoxy resin plastic or other suitable material mounted pivotally on an arm that can be attached to and removed from the truck's tail gate.

The assembly folds compactly onto the interior of the tailgate when not in use. This allows the tail gate to be raised and secured for driving. When the tail gate is down, the assembly can be pivoted outward behind the truck. One or two folded legs can be moved into position and then extended to contact the ground or road surface behind the truck. The box can be accessed from the rear with its lid opening toward the truck or away from it. The entire box is optional, and the present invention can be used as simply a utility table.

After the assembly is pivoted into position, it remains locked by forces on the leg(s) and the swivel arm contacting the table under the box as well as forces between the arm and the tailgate attach. In the unfolded position, the assembly is extremely stable and can support considerable weight. In the unfolded position the present invention thus becomes a table, a storage container, a sink for liquids, and with several optional circular holes, a holder for bottles, drinks or other containers. When the lid is closed, the lid itself becomes available for further use as a table. The present invention can be used for display, food preparation, fish cleaning, tool or food storage, or as a workbench as well as numerous other uses.

The present invention can be removably attached to the truck's tail gate with a strap, multiple straps, or a simple strap turnbuckle arrangement, or the assembly can be permanently installed. The entire assembly can be totally removed for storage when the truck must be used for other purposes. Since re-attachment is fast and simple, it only takes moments to put it on the truck before a field trip or camping trip.

BRIEF DESCRIPTION OF THE DRAWINGS

For a more complete understanding of this invention, reference should now be made to the embodiments illustrated in greater detail in the accompanying drawings and described below by way of examples of the invention.

FIG. 5A shows the unfolded position. FIG. 5B shows it partially folded. FIG. 5C shows it completely folded. FIG. 5D shows it in the stowed position on the interior of the closed tailgate.

It should be understood, of course, that the invention is not necessarily limited to the particular embodiments illustrated herein.

DESCRIPTION OF PREFERRED EMBODIMENTS

Figure 1:
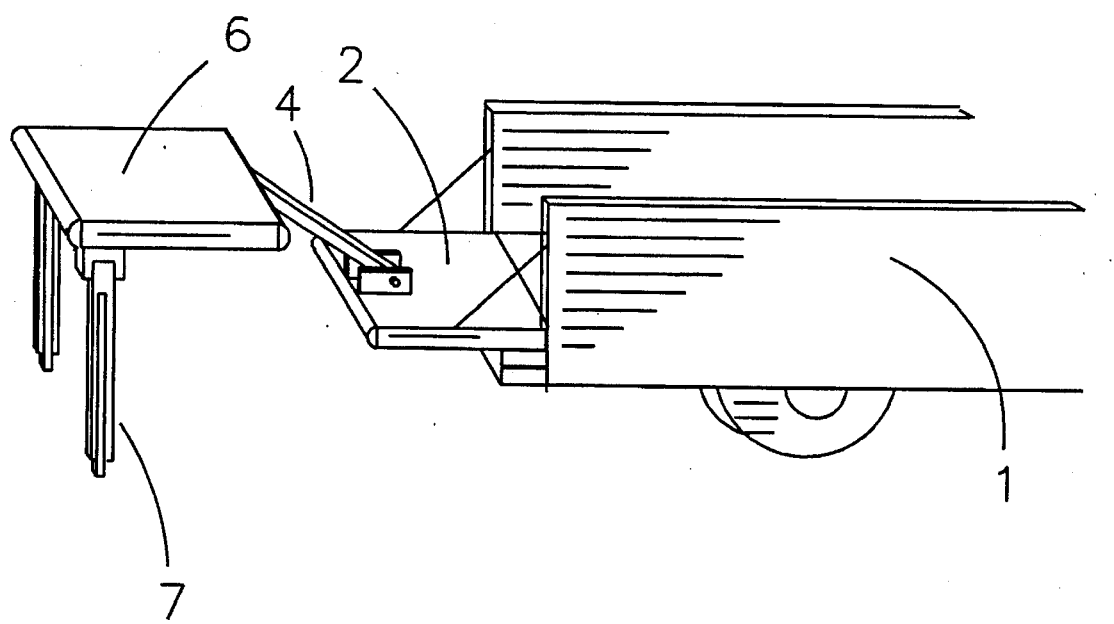
FIG. 1 shows a perspective view of an embodiment of the present invention being used as a table.

An embodiment of the present invention is shown in FIG. 1. Here the tailgate 2 of a pickup truck 1 can clearly be seen. The tailgate table 6 is shown in the unfolded position. It is supported by a set of telescoping legs 7 and a pivot arm 4 attaching it to the tailgate 2 via a tailgate attaching device that will be called a tailgate attach. The tailgate attach can be a strap, set of straps, or a permanently mounted bracket. When a strap is used as a tailgate attach, a turnbuckle or set of turnbuckles can be used to tighten it.

Figure 2:
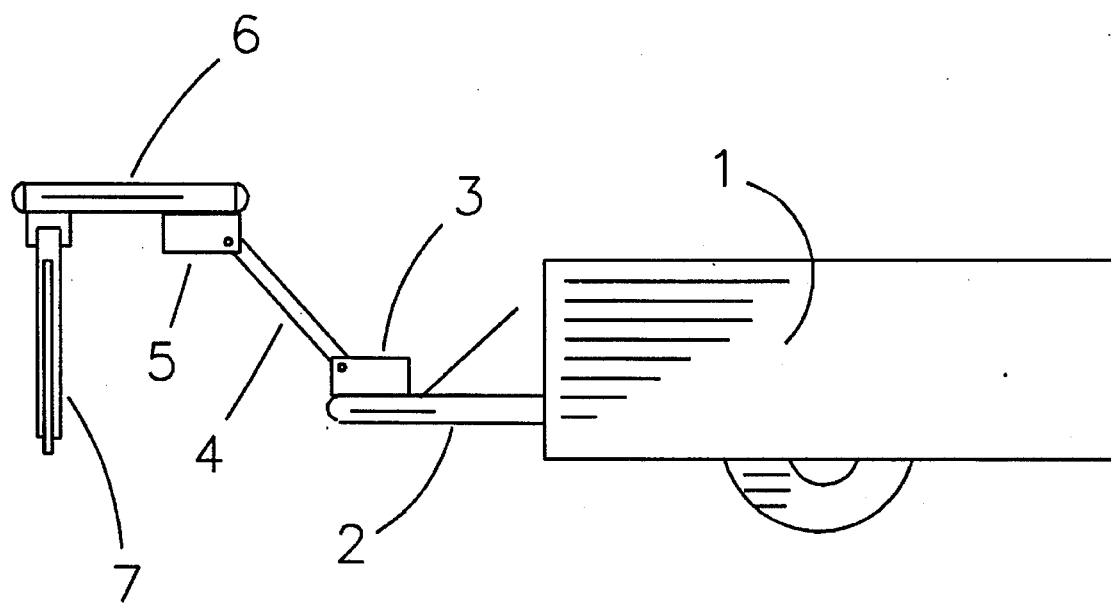
FIG. 2 is a side view of the embodiment shown in FIG. 1.

FIG. 2 shows a side view of the setup of FIG. 1. Again the table 6 is shown supported on a set of legs 7. While the figures show an embodiment of the invention with telescoping legs, it is not necessary to the functioning or structure of the invention that the legs telescope. In fact, any means of support for the rear of the table will work with the present invention. The legs 6 fold laterally when the table is put back in the truck for storage.

The pivot arm 4 can again be seen in FIG. 2 extending between the tailgate 2 and the base of the table 6. An upper pivot support 5 and a lower pivot support 3 can also be seen. These pivot supports can be constructed from vertical metal plates or box stock, molded plastic, or other strong suitable material. These supports 3 and 5 contain a pin that the pivot arm 4 freely rotates on. While metal is the preferred material for the pivot and pivot supports; they can be made of any strong and durable material.

One of the novel features of the present invention is the fact that the pivot arm 4 is free to rotate on the pins in the supports 3 and 5. When the table 6 is in the unfolded or utility position as shown in FIG. 2, the back of the table is held level by torque on the leg or legs 7 rather than by a stop mechanism in the supports. This novel feature allows the table to always be leveled with the legs 7 on any type of terrain or surface. Since the legs 7 only fold laterally and then extend (telescope) down, it is possible for them to support considerable torque in the fore to aft direction.

Of course, a stop can be used in conjunction with the pivot supports 3 and 5 if desired as an optional feature; however, it is not necessary, and is possibly undesirable since any stop that also allows the table to be leveled requires the ability to be adjusted. With no stop, the table becomes self-adjusting to different heights.

Figure 3:
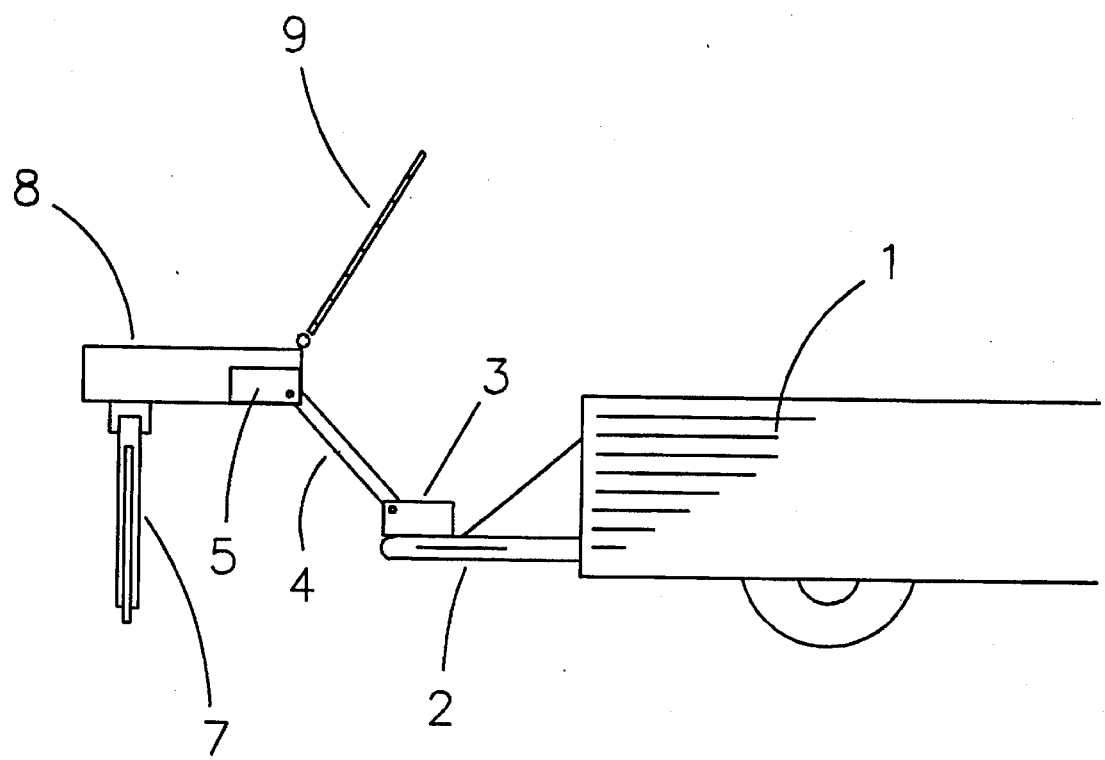
FIG. 3 shows a side view of an embodiment of the present invention with a box and lid that opens toward the truck.

FIG. 3 shows a different embodiment of the present invention. In this embodiment, a box 8 with an optional lid 9 is used in place of a table. This box can be used for storage, for utility, or as a sink to hold liquids. In FIG. 3, the upper pivot support 5 is shown inside the box 8. This is desirable when the structure is folded; however, it is optional whether the support 5 is inside or outside the box 8. The present invention will function just as well with the support mounted to the outside of the box 8.

The lid 9 can optionally be folded down until it is totally horizontal. In this position, it can act as a table. This feature is particularly useful when the box 8 is used as a sink or sinks for liquid. It is also possible to hinge the lid 9 on the opposite side (aft rather than forward), and have it open away from the truck. This arrangement is useful when it is desired to use the truck tailgate 2 as a seat. In this configuration, the present invention allows the user to sit on the tailgate with the box and lid adjusted to convenient height for a seated person on each side of the pivot arm 4. This use of the present invention is well suited for camping trips and tailgate parties.

Since it is immaterial whether the lid 9 hinges forward or aft, it is possible in another embodiment of the present invention to have hinges on both the front and read of the box 8. In this embodiment, the lid 9 is removable and can be attached to either set of hinges depending on whether the user wants it to open toward the truck or away from the truck. When the lid opens toward the rear of the truck, the user can sit on the tailgate if desired. The height of the table or box can be adjusted to any desired height by using the telescoping legs.

Figure 4:
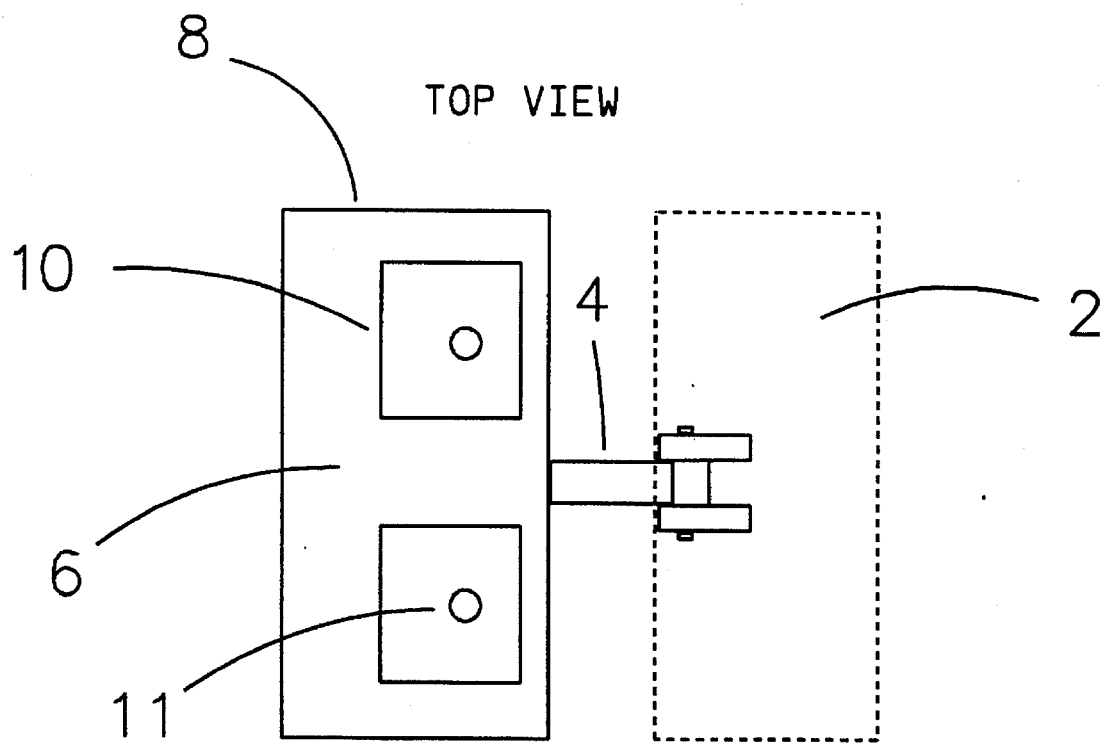
FIG. 4 is a top view that shows two sinks with drains.

FIG. 4 shows a top view of the box 8 (the lid 9 is not shown for clarity). The box 8 in this embodiment comprises a flat utility surface 6 and one or two sinks 10. Each sink 10 can be optionally equipped with a drain 11. This allows the sinks 10 to contain liquids (for dishwashing, fish cleaning, etc.) and to be easily drained and cleaned. FIG. 4 also shows the truck tailgate 2 and the pivot arm 4.

Figure 5:
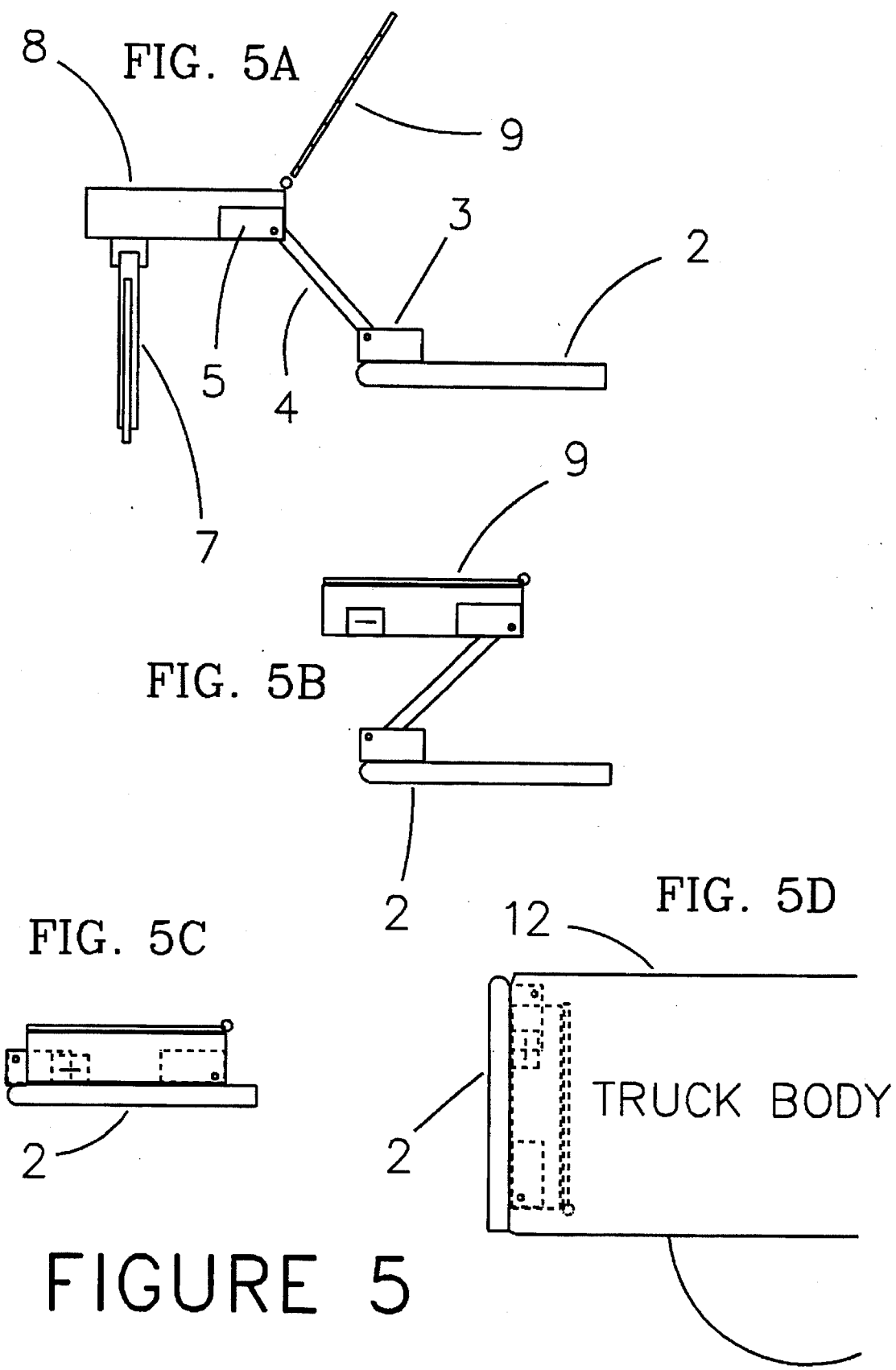
FIG. 5 shows the steps in folding the present invention for storage.

FIG. 5 depicts how the present invention folds into the rear of a pickup truck when stowed for transport. FIG. 5A shows the operational or use position. The legs 7 are extended to support the box or table 8. The pivot arm 4 is extended outward from the tailgate 2.

FIG. 5B shows the present invention partially folded. The lid 9 is closed, and the pivot arm 4 is pivoted toward the tailgate 2.

FIG. 5C shows the present invention folded on the open tailgate 2. Finally FIG. 5D shows the tailgate 2 in the up position with the present invention tucked into the truck bed 12. In this position, the present invention takes up very little room in the truck bed and is ready for unfolding and use when needed.

It is also desirable to have round holes in the flat surface forming the table or lid to hold drinking cups or other liquid containers. In the embodiment containing two sinks, the upper pivot arm support can optionally be located between them on the underside of a top plate. This causes the assembly to take up less room when folded.

The present invention can be constructed entirely of metal, or other strong materials such as molded resin plastic can be used. Various combinations of materials such as metal, plastics, or composites can be used. The only material requirements are strength and durability.

A preferred method of locking the telescoping legs is with the use of a pin. It is advantageous to use different hole spacing on the different parts of the telescoping leg. This leads to greater resolution of height adjustment.

To avoid excessive unwanted swivel of the table or box, it is advisable to use washers at the top and bottom pivot pins. Square plastic washers work well since they-do not tend to rotate.

It is possible for the pivot pin holes to wear when softer material is used. To prevent the corner of the pivot arm from binding, that corner can be rounded.

It is to be understood that the above-described arrangements are merely illustrative of the application of the principles of the invention, and that other arrangements may be devised by those skilled in the art without departing from the spirit and scope of the invention.

I claim:

1. A pickup truck tailgate utility device comprising, in combination:

a generally flat table surface;

a tailgate attach removably mounted to a pickup truck tailgate;

an elongated arm member pivotally coupled to said flat table surface and pivotally coupled to said tailgate attach; extendable legs fastened to said flat surface, whereby said legs fold parallel to said flat table surface for storage, said legs supporting said flat surface when extended.

2. The pickup truck tailgate utility device claimed in claim 1 further comprising a storage box removably attached to said flat table surface.

3. The pickup truck tailgate utility device claimed in claim 1 further comprising a storage box fixedly attached to said flat table surface.

4. The tailgate utility device claimed in claim 1 wherein said generally flat surface comprises a plurality of parts, said parts joined to form at least one aperture, said aperture adapted to hold liquid containers such as cups and glasses.

5. The tailgate utility device claimed in claim 1 further comprising a sink for holding liquids cooperating with said flat table surface.

6. The tailgate utility device claimed in claim 5 wherein said sink contains at least one drain.

7. A tailgate utility device comprising, in combination:

a generally rectangular utility box;

a tailgate attach removably mounted to a pickup truck tailgate;

an elongated arm member pivotally coupled to said utility box and pivotally coupled to said tailgate attach;

extendable legs fastened to said utility box, whereby said legs fold parallel to said utility box for storage, said legs supporting said flat surface when extended.

8. The tailgate utility device claimed in claim 7 further comprising a sink mounted in said rectangular box, said sink for holding liquids.

9. The tailgate utility device claimed in claim 8 further comprising a drain in said sink.

10. The tailgate utility device claimed in claim 7 further comprising a strap, whereby said strap mounts said tail gate attach to a truck tailgate.

11. The tailgate utility device claimed in claim 7 further comprising a cover hingedly attached to said rectangular utility box, whereby said cover has a closed position and an open position.

12. The tailgate utility device claimed in claim 11 wherein said cover opens toward said tailgate.

13. The tailgate utility device claimed in claim 11 wherein said cover opens away from said tailgate.

14. A tail gate utility device comprising, in combination:

a generally rectangular utility box;

a tailgate attach removably mounted to a pickup truck tailgate;

a strap, whereby said strap removably mounts said tail gate attach to a truck tail gate;

an elongated arm member pivotally coupled to said utility box and pivotally coupled to said tailgate attach;

extendable legs fastened to said utility box, whereby said legs fold parallel to said utility box for storage, said legs supporting said flat surface when extended;

a sink mounted in said utility box, said sink for holding liquids.

15. The tailgate utility device claimed in claim 14 wherein said sink has at least one drain.

* * * * *